US010021537B2

(12) United States Patent
Saeki

(10) Patent No.: US 10,021,537 B2
(45) Date of Patent: Jul. 10, 2018

(54) WIRELESS COMMUNICATION NETWORK SYSTEM AND METHOD FOR DETERMINING REPRESENTATIVE SENSOR DEVICE

(71) Applicant: NEC Corporation, Tokyo (JP)

(72) Inventor: Tomoyuki Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 21 days.

(21) Appl. No.: 15/113,325

(22) PCT Filed: Feb. 2, 2015

(86) PCT No.: PCT/JP2015/000433
§ 371 (c)(1),
(2) Date: Jul. 21, 2016

(87) PCT Pub. No.: WO2015/118847
PCT Pub. Date: Aug. 13, 2015

(65) Prior Publication Data
US 2017/0013424 A1    Jan. 12, 2017

(30) Foreign Application Priority Data

Feb. 4, 2014   (JP) .................................. 2014-019531

(51) Int. Cl.
*H04W 4/08*   (2009.01)
*H04W 72/08*  (2009.01)
(Continued)

(52) U.S. Cl.
CPC .............. *H04W 4/08* (2013.01); *H04W 72/08* (2013.01); *H04W 84/20* (2013.01); *H04W 4/005* (2013.01); *H04W 4/70* (2018.02); *H04W 88/08* (2013.01)

(58) Field of Classification Search
None
See application file for complete search history.

(56) References Cited

U.S. PATENT DOCUMENTS

2009/0210075 A1*  8/2009  Moriwaki ........... H04L 41/0654
                                               700/28
2010/0074133 A1*  3/2010  Kim ..................... G01S 5/0289
                                               370/252
(Continued)

FOREIGN PATENT DOCUMENTS

WO  WO-2006/090480 A1   8/2006
WO  WO-2012/164739 A1  12/2012
WO  WO-2013/035959 A1   3/2013

OTHER PUBLICATIONS

International Search Report corresponding to PCT/JP2015/000433, 1 page, dated Mar. 17, 2015.
(Continued)

*Primary Examiner* — Robert C. Scheibel
(74) *Attorney, Agent, or Firm* — Wilmer Cutler Pickering Hale and Dorr LLP

(57) ABSTRACT

[Problem] To provide a wireless communication network system and a method for determining a representative sensor device for appropriately selecting, from a plurality of sensor devices, a device with which a server communicates. [Solution] A server (120) transmits a group representative determination request including a list of parameters for determining a representative sensor device. Sensor devices (140*a-z*) transmit, upon receiving the parameter list, a device parameter indicating the parameter of each of the sensor devices corresponding to the parameter list. The representative sensor device is determined on the basis of the device parameters transmitted by the sensor devices (140*a-z*). The representative sensor device transmits, to the server (120), measurement result information generated by the sensor device itself and measurement result information generated by the other sensor devices.

7 Claims, 6 Drawing Sheets

(51) Int. Cl.
  *H04W 84/20* (2009.01)
  *H04W 4/70* (2018.01)
  *H04W 4/00* (2018.01)
  *H04W 88/08* (2009.01)

(56) References Cited

U.S. PATENT DOCUMENTS

| | | | |
|---|---|---|---|
| 2013/0128786 A1* | 5/2013 | Sultan | H04W 52/0238 370/311 |
| 2014/0185503 A1* | 7/2014 | Roy | H04W 52/0216 370/311 |
| 2014/0213252 A1* | 7/2014 | Jung | H04W 8/186 455/435.1 |
| 2014/0359035 A1* | 12/2014 | Wang | H04L 51/06 709/206 |

OTHER PUBLICATIONS

English Translation of Written Opinion of PCT/JP2015/000433, dated Mar. 17, 2015, 4 pages.

3GPP, TR22.888 V12.0.0, (Mar. 2013) $3^{rd}$ Generation Partnership Project; Technical Specification Group Services and System Aspects; "Study on enhancements for Machine-Type Communications" (MTC) (Release 12), Mar. 2013, pp. 1-22.

\* cited by examiner

Fig. 3

PARAMETER LIST

1. CPU PERFORMANCE

2. BATTERY REMAINING CAPACITY, 70%

US 10,021,537 B2

WIRELESS COMMUNICATION NETWORK SYSTEM AND METHOD FOR DETERMINING REPRESENTATIVE SENSOR DEVICE

CROSS-REFERENCE TO RELATED APPLICATIONS

This application is a national stage application of International Application No. PCT/JP2015/000433 entitled "WIRELESS COMMUNICATION NETWORK SYSTEM AND METHOD FOR DETERMINING REPRESENTATIVE SENSOR DEVICE," filed on Feb. 2, 2015, which claims the benefit of the priority of Japanese Patent Application No. 2014-019531 filed on Feb. 4, 2014, the disclosures of each of which are hereby incorporated by reference in their entirety.

TECHNICAL FIELD

The present invention relates to a wireless communication network system and a method for determining a representative sensor device.

BACKGROUND ART

A great number of sensor devices and a server or the like controlling the sensor devices are expected to be connected to a wireless communication network. In such a state that the great number of sensor devices and the server or the like are connected to the wireless communication network, individual communication between each of the sensor devices and the server or the like via the wireless communication network requires the use of many radio resources of the wireless communication network. The use of many radio resources may cause a trouble, such as congestion, in the wireless communication network.

Third Generation Partnership Project (3GPP) proposes a method whereby each of Machine-Type Communications (MTC) devices mutually communicates in a group constituted of a plurality of the MTC devices, and a representative device of the group communicates with a server via a wireless communication network (for example, see NPL 1).

In addition, PTL 1 describes a system in which a server receives measurement data from a measuring device as a representative of a plurality of measuring devices constituting a group, and performs processing based on the received measurement data.

CITATION LIST

Patent Literature

[PTL 1] International Publication WO 2012/164739

Non Patent Literature

[NPL 1] 3GPP, TR22.888 V12.0.0, "Study on enhancements for Machine-Type Communications (MTC) (Release 12), 2013

SUMMARY OF INVENTION

Technical Problem

However, according to the method described in NPL 1 and the system described in PTL 1, when there is a problem in a representative device communicating with a server, it causes a problem in communication between the server and each device constituting a group that includes the representative device. This may cause a problem in transmission and reception of a result of measurement by each device.

Accordingly, an object of the present invention is to provide a wireless communication network system that makes appropriate selection of a sensor device for communicating with a server from among a plurality of sensor devices and a method for determining a representative sensor device.

Solution to Problem

A wireless communication network system, according to the present invention, comprises: a plurality of sensor devices mutually connected via a communication network; an information processing device transmitting and receiving information to and from at least a part of the plurality of sensor devices via a radio base station; and representative sensor device determining means selecting and determining, from among the plurality of sensor devices, a representative sensor device for transmitting measurement result information indicating a result of measurement by each of the plurality of sensor devices to the information processing device via the radio base station, wherein the information processing device transmits parameter list information including a list of parameters for the representative sensor device determining means to determine the representative sensor device; upon receiving the parameter list information, the sensor device transmits device parameter information indicating a parameter of the own sensor device corresponding to a list of parameters included in the parameter list information; the representative sensor device determining means determines the representative sensor device based on the device parameter information; and the sensor device determined as being the representative sensor device by the representative sensor device determining means transmits, to the information processing device, measurement result information generated by the own sensor device and measurement result information generated by the other sensor devices.

A method, according to the present invention, for determining a representative sensor device in a wireless communication network system, the method comprises: transmitting, by an information processing device transmitting and receiving information via a radio base station to and from at least a part of a plurality of sensor devices mutually connected via a communication network, parameter list information including a list of parameters to select and determine, from among the plurality of sensor devices, a representative sensor device for transmitting measurement result information indicating a result of measurement by each of the plurality of sensor devices to the own information processing device via the radio base station; transmitting, by the sensor device upon receiving the parameter list information, device parameter information indicating a parameter of the own sensor device corresponding to a list of parameters included in the parameter list information; determining, by representative sensor device determining means for determining the representative sensor device, the representative sensor device based on the device parameter information; and transmitting, by the sensor device determined as being the representative sensor device by the representative sensor device determining means, measurement result information generated by the own sensor device and measurement result information generated by the other sensor devices, to the information processing device.

Advantageous Effects of Invention

According to the present invention, an appropriate sensor device may be selected for communicating with a server, from among a plurality of sensor devices in a wireless communication network system.

BRIEF DESCRIPTION OF DRAWINGS

FIG. 3 is an explanatory diagram illustrating an example of a parameter list.

DESCRIPTION OF EMBODIMENTS

Exemplary Embodiment 1

Figure 1:
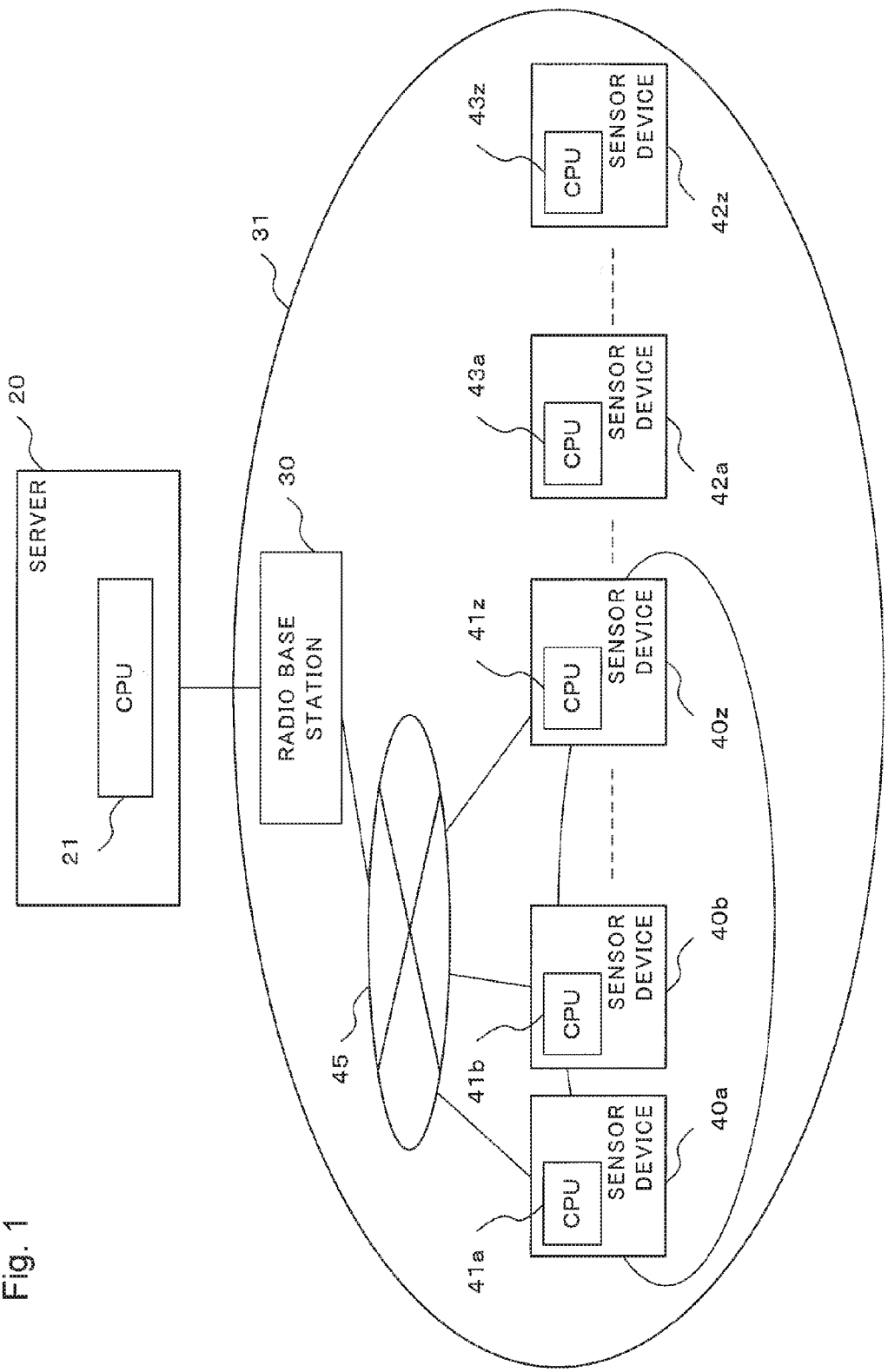
FIG. 1 is a block diagram illustrating a configuration example of a wireless communication network system according to a first exemplary embodiment of the present invention.

A wireless communication network system according to a first exemplary embodiment of the present invention is described with reference to the drawings. FIG. 1 is a block diagram illustrating a configuration example of the wireless communication network system according to the first exemplary embodiment of the present invention.

As illustrated in FIG. 1, the wireless communication network system according to the first exemplary embodiment of the present invention includes a server 20 and a plurality of sensor devices 40a to 40z that generate measurement result information indicating results of measurement processing.

The sensor devices 40a to 40z are individually connected to a wired or wireless Local Area Network (LAN) 45 and are capable of communicating while recognizing one another. Hereinafter, description is made on the premise that the sensor devices 40a to 40z are connected to the LAN 45. Alternatively, the sensor devices 40a to 40z may be individually connected to an ad-hoc network and may be capable of communicating with one another via the ad-hoc network.

The server 20 and a radio base station 30 are capable of transmitting and receiving information to and from each other by wired or wireless communication. Further, at least a part of the plurality of sensor devices 40a to 40z are disposed within a cell 31 of the radio base station 30 and are capable of communicating with the server 20 via the LAN 45 and the radio base station 30 connected to the LAN 45.

The sensor devices 40a to 40z individually use Central Processing Units (CPUs) 41a to 41z that are respectively mounted thereon to perform predetermined measurement processing and generate measurement result information indicating results of the measurement processing. Further, the sensor devices 40a to 40z then transmit the generated measurement result information via the LAN 45.

Note that sensor devices 42a to 42z on which CPUs 43a to 43z are respectively mounted are also disposed within the cell 31 of the radio base station 30, as illustrated in FIG. 1. The sensor devices 40a to 40z form a group with a preliminarily given group ID that is discriminable from the sensor devices 42a to 42z.

The server 20 has a CPU 21 mounted thereon. Further, the server (particularly, the CPU 21) determines a sensor device for communicating via the LAN 45 and the radio base station 30 from among the sensor devices 40a to 40z. Such a sensor device among the sensor devices 40a to 40z that communicates with the server 20 via the LAN 45 and the radio base station 30 is hereinafter referred to as a representative sensor device.

The server 20 receives the measurement result information generated by each of the sensor devices 40a to 40z and transmitted from the representative sensor device via the LAN 45 and the radio base station 30.

Figure 2:
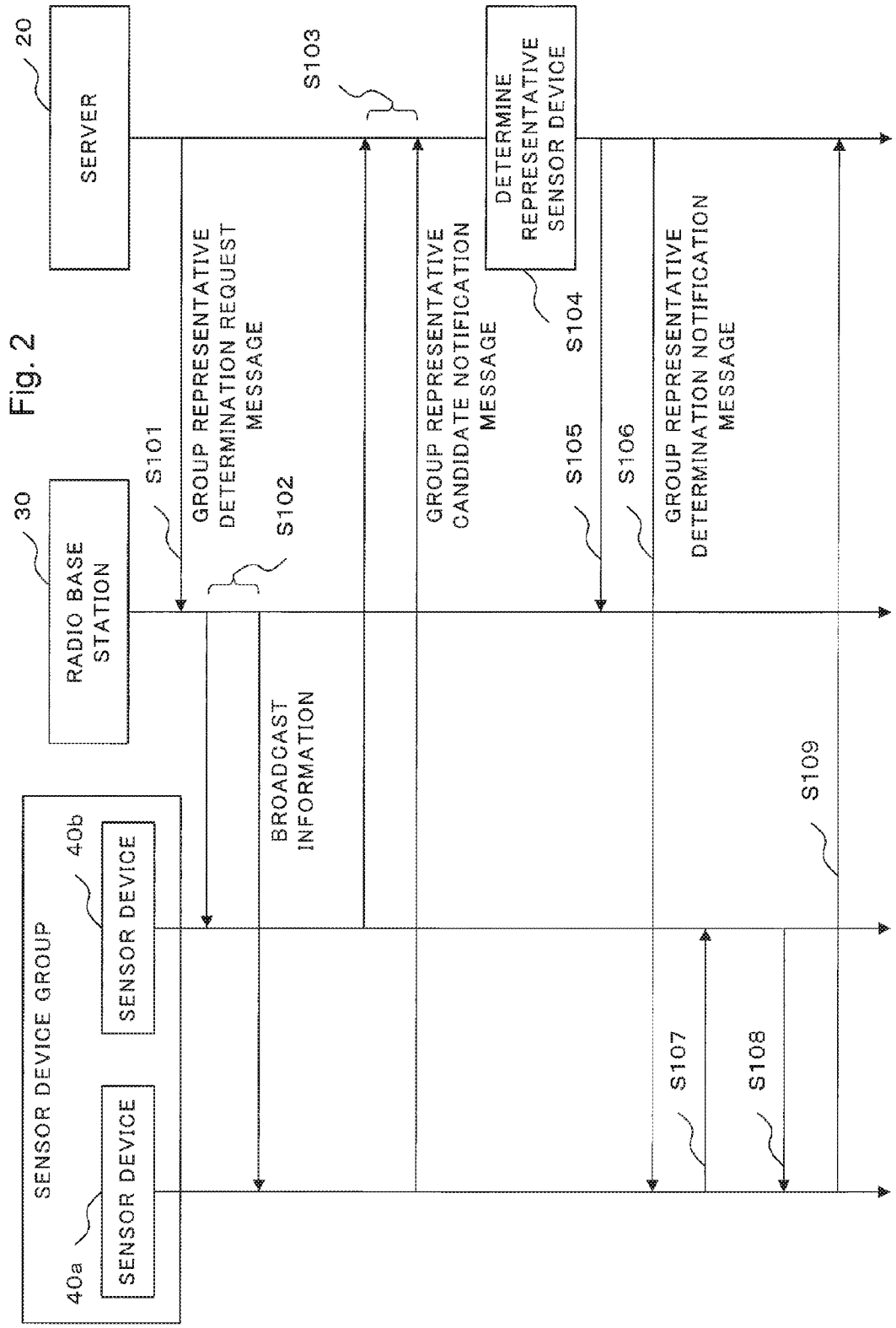
FIG. 2 is a sequence diagram illustrating the operation of the wireless communication network system according to the first exemplary embodiment of the present invention.

Next, the operation of the wireless communication network system according to the first exemplary embodiment of the present invention is described with reference to the drawings. FIG. 2 is a sequence diagram illustrating the operation of the wireless communication network system according to the first exemplary embodiment of the present invention. FIG. 2 only shows the sensor devices 40a and 40b as representatives of a sensor device group. First, there is described a method of selecting and determining the representative sensor device by the server 20 from among the sensor devices 40a to 40z. Then, there is described a method of transmitting the measurement result information from each of the sensor devices 40a to 40z to the server 20 in response to the determination of the representative sensor device. Note that description herein is made on an example in which the sensor device 40a is determined as being the representative sensor device.

As illustrated in FIG. 2, the server 20 transmits, to the radio base station 30, a group representative determination request message for requesting determination of a representative sensor device (Step S101). The group representative determination request message in this example includes a group ID indicating a group constituted of the devices 40a to 40z and a parameter list.

The parameter list, which will be described later in detail, is a list of parameters for the server 20 to determine the representative sensor device from among the sensor devices 40a to 40z. Specifically, examples of the parameters include such as the wireless transmission power, the battery remaining capacity, and the CPU performance of each device. Note that the parameter list may include a threshold value for each parameter.

Upon receiving the group representative determination request message, the radio base station 30 broadcasts broadcast information that is the information including the group ID and the parameter list included in the message (Step S102). Sensor devices disposed within the cell 31 that are capable of wirelessly communicating with the radio base station 30 receive the broadcast information.

The sensor devices that have received the broadcast information transmitted from the radio base station 30 transmit a group representative candidate notification message to the server 20 via the radio base station 30 based on the broadcast information (Step S103). Note that the sensor devices executing the processing of Step S103 are the sensor devices that have received the broadcast information and have the group ID that matches the group ID included in the broadcasted broadcast information. In addition, the sensor devices which have the group ID that matches the group ID included in the broadcast information are at least a part of the sensor devices 40a to 40z that are capable of wirelessly communicating with the radio base station 30 from among the sensor devices 40a to 40z. The group representative candidate notification message to be transmitted at Step S103 includes device parameters corresponding to the parameter list included in the broadcasted broadcast information.

The device parameters corresponding to the parameter list refers to information indicating the status, the performance, and the like of the sensor devices 40a to 40z using the parameters included in the parameter list, and will be described later in detail.

Note that the server 20 may return to the processing of Step S101 when receiving no group representative candidate notification message even a predetermined period of time has elapsed from the time when transmitting the group representative determination request message in the processing of Step S101. Further, the server 20 may be configured so as to transmit a group representative determination request message including a parameter list different from the parameter list in the already transmitted group representative determination request message.

When the server 20 receives the group representative candidate notification message transmitted from at least a part of the sensor devices 40a to 40z by the time when the predetermined period of time elapses from the start of broadcasting of the broadcast information, the CPU 21 determines the representative sensor device based on the status, the performance, and the like of each of the sensor devices 40a to 40z indicated by the device parameters included in the group representative candidate notification message (Step S104).

The CPU 21 determines a sensor device with the best device parameter as being the representative sensor device. The determination method thereof will be described later in detail. Note that the sensor device 40a is assumed to be determined as being the representative sensor device herein.

The server 20 transmits a group representative determination notification message to the radio base station 30 indicating that the sensor device 40a is determined as being the representative sensor device (Step S105). Upon receiving the group representative determination notification message, the radio base station 30 stops broadcasting of the broadcast information. The server 20 may transmit no group representative determination notification message to the radio base station 30. Further, the radio base station 30 may be configured so as to stop broadcasting of the broadcast information when the predetermined period of time elapses from the start of broadcasting of the broadcast information. Such a configuration satisfactorily prevents the increase in the communication amount of the server 20.

Further, the server 20 transmits the group representative determination notification message to the sensor device 40a that is the representative sensor device, via the radio base station 30 and the LAN 45 (Step S106).

In response to the reception of the group representative determination notification message, the sensor device 40a that is the representative sensor device, notifies the other sensor devices 40b to 40z with the same group ID as the group ID of the representative sensor device 40a that the sensor device 40a is determined as being the representative sensor device (Step S107).

The sensor devices 40b to 40z individually generate measurement result information indicating results of measuring predetermined corresponding objects by utilizing the CPUs 41b to 41z and transmit the measurement result information to the sensor device 40a that is the representative sensor device, via the LAN 45 (Step S108). The sensor device 40a that is the representative sensor device, generates measurement result information indicating a result of measuring a predetermined object by utilizing the CPU 41a. Then, the sensor device 40a that is the representative sensor device, then transmits the measurement result information generated by itself and the measurement result information received from each of the sensor devices 40b to 40z via the LAN 45, to the server 20 via the LAN 45 and the radio base station 30 (Step S109).

Now the aforementioned parameter list is described. FIG. 3 is an explanatory diagram illustrating an example of a parameter list. In the example shown in FIG. 3, the parameter list includes "1. CPU performance" and "2. Battery remaining capacity" as the parameters for the server 20 to determine the representative sensor device from among the sensor devices 40a to 40z, indicating that the CPU performance is higher in priority than the battery remaining capacity. In addition, the example shown in FIG. 3 indicates that the threshold value of the battery remaining capacity is 70%.

The parameter list may be created, for example, by an administrator of the wireless communication network system, by the radio base station 30, or by the server 20, corresponding to groups of sensor devices performing measurement processing.

A first method and a second method for creating a parameter list by the server 20 are described. In the first method, for example, when it is known that sensor devices constituting a group from which to determine a representative sensor device are small fixed sensors, the server 20 creates a parameter list of a type for small fixed sensor group. Here, the parameter list of a type for small fixed sensor group preliminarily includes the CPU performance, the wireless communication quality, and the like with an order of priority. Examples of the CPU performance parameter include Floating-point Operations Per Second (FLOPS). Examples of the wireless communication quality parameter include Reference Signal Received Quality (RSRQ).

In addition, for example, when it is known that sensor devices constituting a group from which to determine a representative sensor device are battery built-in mobile sensors, the server 20 creates a parameter list of a type for battery built-in mobile sensor group. The parameter list of a type for battery built-in mobile sensor group preliminarily includes the battery remaining capacity, the CPU performance, and the like with an order of priority.

In the second method for creating a parameter list, for example, the server 20 requests sensor devices, in a group from which to determine a representative sensor device, to transmit device information (e.g., positional information indicating the current position of the devices, information indicating the battery remaining capacity, and information indicating the wireless communication quality). The server 20 then collects the device information transmitted in response to the request. Further, the server 20 determines whether the sensor devices in the group are small fixed sensors or battery built-in mobile sensors based on the device information received within a predetermined period of time, and creates a parameter list corresponding to the determination result.

Specifically, for example, the server 20 first determines whether each sensor device has moved based on the positional information included in the device information received within the predetermined period of time. Further, the server 20 determines whether the battery remaining capacity of each sensor device has decreased more than a predetermined amount based on the information indicating the battery remaining capacity included in the device information.

Accordingly, when the group has the given number or more of the sensor devices which are determined to have moved and also determined that the battery remaining capacity has decreased more than the predetermined amount, the server 20 determines that the group is a group of battery built-in mobile sensors. The server 20 creates a parameter list of a type for battery built-in mobile sensor group in accordance with the determination result.

Further, when the group has less than the given number of the sensor devices 40 which are determined to have moved and also determined that the battery remaining capacity has decreased more than the predetermined amount, the server 20 determines that the group is a group of small fixed sensors. The server 20 then creates a parameter list of a type for small fixed sensor group in accordance with the determination result.

Next, the aforementioned device parameters corresponding to the parameter list are described. The device parameters corresponding to the parameter list include, for example, information indicating the battery remaining capacity (e.g., 50% or 80%) when the parameter list includes the battery remaining capacity, and include, for example, information indicating the value of FLOPS when the parameter list includes the CPU performance.

Note that the sensor devices 40*a* to 40*z* are preferably configured not to transmit group representative candidate notification message in the processing of Step S103 when it is determined that the device parameter does not meet the condition, namely, for example, the device parameter does not exceed the threshold value indicated in the parameter list. Specifically, it is preferable that the sensor device 40*a* does not transmit group representative candidate notification message in the processing of Step S103 when, for example, the threshold value of the battery remaining capacity indicated in the parameter list is 70% whereas the battery remaining capacity of the sensor device 40*a* is 60%. Such a configuration satisfactorily prevents the increase in the communication amount.

Next, the aforementioned determination of a representative sensor device is specifically described. When a parameter list includes the CPU performance and the battery remaining capacity, and indicates that the priority of the CPU performance is higher in priority than the battery remaining capacity, the CPU 21 of the server 20 determines a sensor device with the best CPU performance (e.g., the sensor device 40*a*) as being the representative sensor device.

In addition, when there exist a plurality of sensor devices with the best CPU performance being highest in priority, the CPU 21 of the server 20 determines a sensor device with the largest battery remaining capacity, the parameter next highest in priority, as being the representative sensor device from among the plurality of sensor devices. Specifically, for example, when the sensor devices 40*a* and 40*b* out of the sensor devices 40*a* to 40*z* have the best and the same CPU performance, the CPU 21 of the server 20 determines, for example, the sensor device 40*a* with the largest battery remaining capacity as being the representative sensor device.

Note that when the difference upon comparison of the parameter indicated as being the highest in priority between one sensor device with the best parameter value and another sensor device with the second best parameter value is equal to or smaller than a predetermined value (which may be a ratio), the parameter indicated as being the highest in priority is regarded as the same between the sensor devices. Moreover, the sensor device with the better parameter, the parameter being next highest in priority, may be determined as being the representative sensor device.

According to the present exemplary embodiment, an appropriate representative sensor device for communicating with the server 20 from the group constituted of the sensor devices 40*a* to 40*z* mutually communicating via the LAN 45 in accordance with the use application or the type of the sensor devices 40*a* to 40*z*. Consequently, this prevents a problem in transmission and reception of the measurement results that would be caused by the insufficient battery remaining capacity or CPU processing capacity in the representative sensor device.

Exemplary Embodiment 2

Next, a second exemplary embodiment of the present invention is described. In the first exemplary embodiment described above, the sensor devices 40*a* to 40*z* each transmit the group representative candidate notification message to the server 20 via the radio base station 30. In contrast, in the second exemplary embodiment, the sensor device 40*b* served as a temporary representative sensor device transmits the group representative candidate notification message to the server 20 via the radio base station 30.

The second exemplary embodiment of the present invention has the same configuration as the first exemplary embodiment illustrated in FIG. 1, and thus, the same reference numerals as the first exemplary embodiment are used for the corresponding constitutional elements, and the explanation therefore is omitted.

Figure 4:
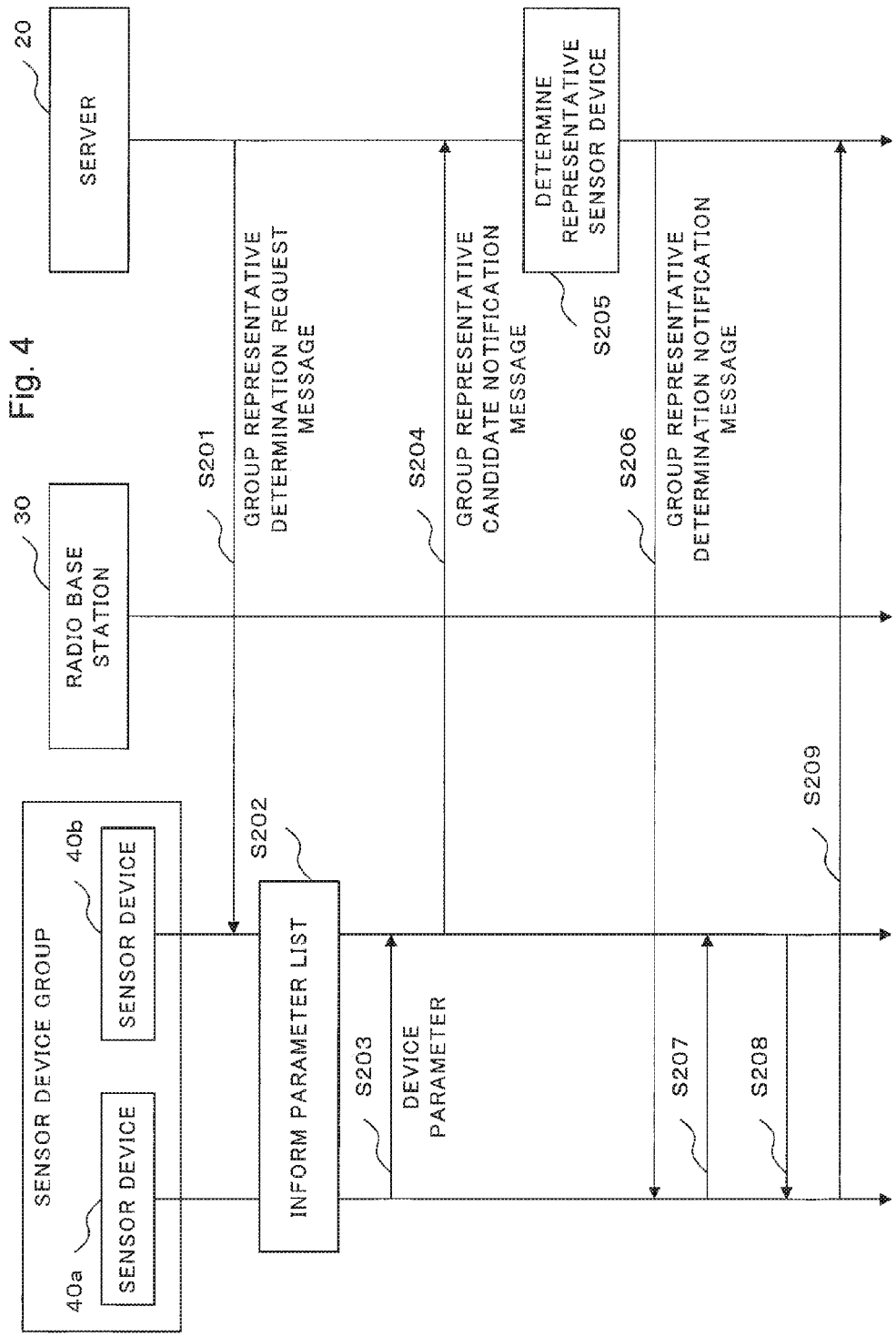
FIG. 4 is a sequence diagram illustrating the operation of the wireless communication network system according to a second exemplary embodiment of the present invention.

The operation of the wireless communication network system according to the second exemplary embodiment of the present invention is described with reference to the drawings. FIG. 4 is a sequence diagram illustrating the operation of the wireless communication network system according to the second exemplary embodiment of the present invention. FIG. 4 only shows the sensor devices 40*a* and 40*b* as representatives of a sensor device group.

As illustrated in FIG. 4, the server 20 transmits a group representative determination request message to the sensor device 40*b* served as a temporary representative sensor device via the radio base station 30 (Step S201).

Note that the temporary representative sensor device may be determined in advance by an administrator of the wireless communication network system. Alternatively, a sensor device, among the sensor devices 40*a* to 40*z* belonging to the group, that first communicates with the server 20 via the radio base station 30 may be determined as being the temporary representative sensor device. This example assumes that the sensor device 40*b* is determined as being the temporary representative sensor device.

The sensor device 40*b* that is the temporary representative sensor device, which has received the group representative determination request message transmits information indicating the parameter list included in the group representative determination request message to sensor devices with the group ID that matches the group ID included in the group representative determination request message via the LAN 45 (Step S202). The sensor devices with the group ID that matches the group ID included in the group representative determination request message are the sensor devices 40*a* to 40*z* (excluding the sensor device 40*b*).

At least a part of the sensor devices 40a to 40z that are capable of wirelessly communicating with the radio base station 30 from among the sensor devices 40a to 40z transmit information indicating device parameters corresponding to the parameter list to the sensor device 40b that is the temporary representative sensor device, via the LAN 45 based on the received information indicating the parameter list (Step S203).

Note that the sensor devices 40a to 40z of the present exemplary embodiment are, as in the first exemplary embodiment, preferably configured so as not to transmit information indicating the device parameter when it is determined that the device parameter does not meet the condition, namely, for example, the device parameter does not exceed the threshold value indicated in the parameter list.

The sensor device 40b that is the temporary representative sensor device, that has received the device parameters from the sensor devices 40a to 40z (excluding the sensor device 40b) transmits a group representative candidate notification message to the server 20 via the LAN 45 and the radio base station 30 (Step S204). Note that the group representative candidate notification message to be transmitted in the processing of Step S204 includes the group ID, the received device parameters, and the device parameters of the sensor device 40b.

The CPU 21 of the server 20 receives the group representative candidate notification message transmitted from the sensor device 40b. Upon reception, the CPU 21 determines a representative sensor device based on the status, the performance, and the like of the sensor devices 40a to 40z indicated by the device parameters included in the received group representative candidate notification message (Step S205). This example assumes that the sensor device 40a is determined as being the representative sensor device. Note that the processing of Step S205 is the same as the processing of Step S104 in the first exemplary embodiment.

The server 20 transmits the group representative determination notification message to the sensor device 40a determined as being the representative sensor device via the radio base station 30 (Step S206).

In response to the reception of the group representative determination notification message, the sensor device 40a that is representative sensor device, notifies the other sensor devices 40b to 40z with the same group ID as the group ID of the representative sensor device 40a that the sensor device 40a is determined as being the representative sensor device (Step S207).

The sensor devices 40b to 40z individually generate measurement result information indicating results of measuring predetermined corresponding objects by utilizing the CPUs 41b to 41z and transmit the measurement result information to the sensor device 40a that is the representative sensor device, via the LAN 45 (Step S208). The sensor device 40a that is the representative sensor device, generates measurement result information indicating a result of measuring a predetermined object by utilizing the CPU 41a. The sensor device 40a that is the representative sensor device, then transmits the measurement result information generated by itself and the measurement result information received from each of the sensor devices 40b to 40z via the LAN 45, to the server 20 via the LAN 45 and the radio base station 30 (Step S209).

According to the present exemplary embodiment, the temporary representative sensor device alone transmits the group representative candidate notification message to the server 20 via the radio base station 30. Consequently, in addition to the advantageous effects of the first exemplary embodiment, the present exemplary embodiment exhibits the advantageous effect that the representative sensor device is appropriately determined with less amount of communication via the radio base station 30 than in the aforementioned operation of the first exemplary embodiment, in which the sensor devices 40a to 40z individually transmit the group representative candidate notification message to the server 20 via the radio base station 30.

Exemplary Embodiment 3

Next, a third exemplary embodiment of the present invention is described. In the first and second exemplary embodiments described above, the CPU 21 of the server 20 determines the representative sensor device. In the present exemplary embodiment, however, the CPU of the temporary representative sensor device determines the representative sensor device.

The third exemplary embodiment of the present invention has the same configuration as the first exemplary embodiment, and thus, the same reference numerals as the first exemplary embodiment illustrated in FIG. 1 are used for the corresponding constitutional elements and the explanation therefore is omitted.

Figure 5:
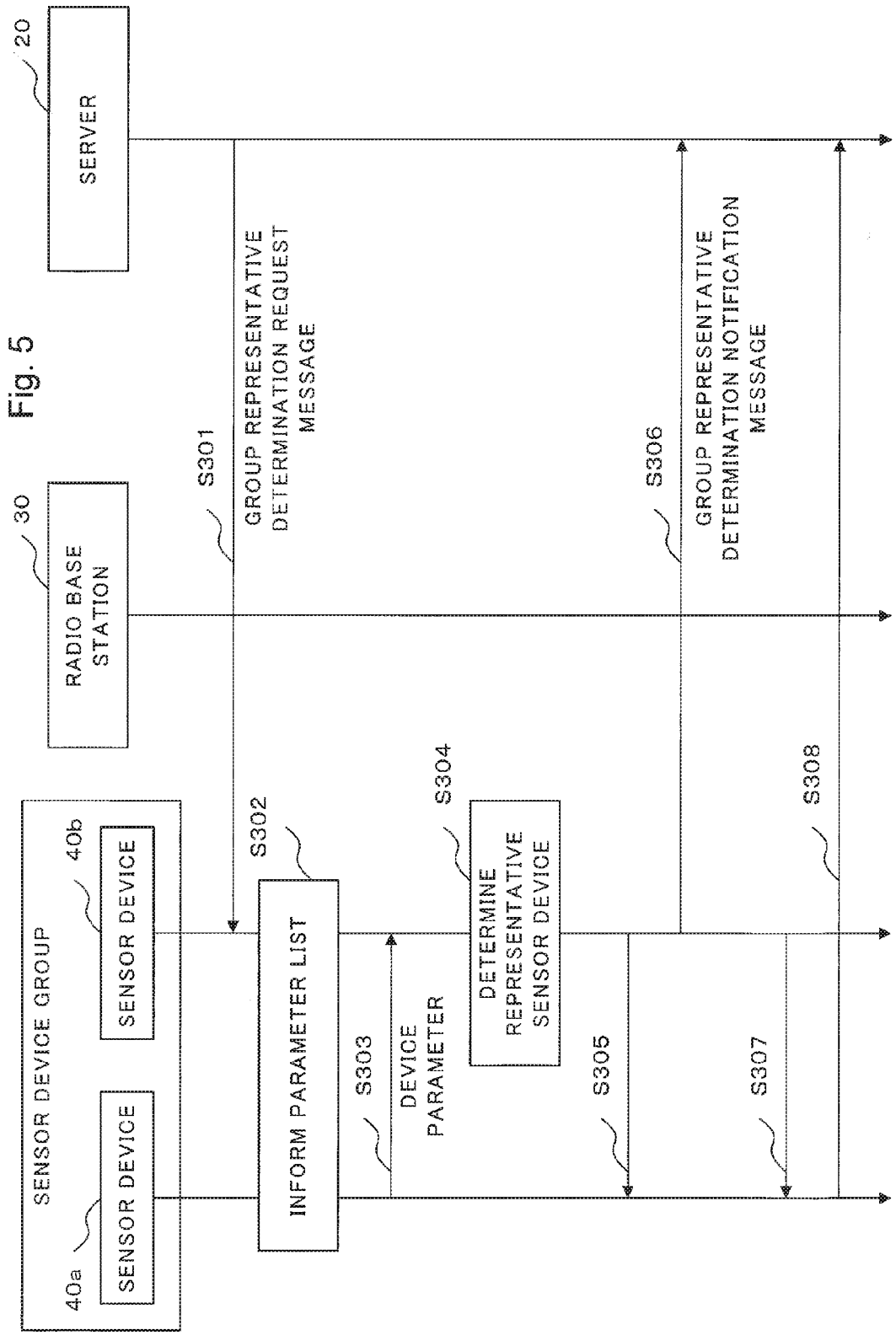
FIG. 5 is a sequence diagram illustrating the operation of the wireless communication network system according to a third exemplary embodiment of the present invention.

The operation of the wireless communication network system according to the third exemplary embodiment of the present invention is described with reference to the drawings. FIG. 5 is a sequence diagram illustrating the operation of the wireless communication network system according to the third exemplary embodiment of the present invention. FIG. 5 only shows the sensor devices 40a and 40b as representatives of a sensor device group.

The operations of Steps S301 to S303 of the present exemplary embodiment illustrated in FIG. 5 are respectively the same as the operations of Steps S201 to S203 of the second exemplary embodiment illustrated in FIG. 4, and thus, the explanation therefore is omitted. Note that the present exemplary embodiment is described on the premise that the sensor device 40b is a temporary representative sensor device, as in the description of the second exemplary embodiment.

The sensor device 40b that is the temporary representative sensor device, receives device parameters from each of the sensor devices 40a to 40z (excluding the sensor device 40b). Upon reception, the CPU 41b of the sensor device 40b determines a representative sensor device based on the status, the performance, and the like of the sensor devices 40a to 40z indicated by the received device parameters and the device parameters of the sensor device 40b itself (Step S304). This example assumes that the CPU 41b of the sensor device 40b determines the sensor device 40a as being the representative sensor device. Note that the processing performed by the CPU 41b of the sensor device 40b at Step S304 is the same as the processing performed by the CPU 21 of the server 20 at Step S104 in the first exemplary embodiment.

The sensor device 40b that is the temporary representative sensor device, transmits an ID of the sensor device 40a, the ID discriminating the sensor device 40a determined as being the representative sensor device from the other sensor devices 40b to 40z, to each of the sensor devices 40a to 40z including the sensor device 40a that is the representative sensor device (Step S305).

In addition, the sensor device 40b that is the temporary representative sensor device, transmits a group representative determination notification message to the server 20 via the LAN 45 and the radio base station 30 (Step S306). The group representative determination notification message to be transmitted at Step S306 includes the group ID, the ID of the sensor device 40a discriminating the sensor device 40a that is the representative sensor device, from the other sensor devices 40b to 40z, and the device parameters of the sensor device 40a that is the representative sensor device.

Note that the device parameters to be transmitted are the device parameters corresponding to the parameter list included in the group representative determination request message transmitted by the server 20.

The sensor devices 40b to 40z individually generate measurement result information indicating results of measuring predetermined corresponding objects by utilizing the CPUs 41b to 41z and transmit the measurement result information to the sensor device 40a that is the representative sensor device, via the LAN 45 (Step S307). The sensor device 40a that is the representative sensor device, generates measurement result information indicating a result of measuring a predetermined object by utilizing the CPU 41a. The sensor device 40a that is the representative sensor device, then transmits the generated measurement result information and the measurement result information received from each of the sensor devices 40b to 40z via the LAN 45, to the server 20 via the LAN 45 and the radio base station 30 (Step S308).

According to the present exemplary embodiment, no group representative candidate notification message is transmitted. Consequently, in addition to the advantageous effects of the first exemplary embodiment, the present exemplary embodiment exhibits the advantageous effect that the representative sensor device is appropriately determined with further less amount of communication via the radio base station 30 than in the operation of the second exemplary embodiment, in which the temporary representative sensor device transmits the group representative candidate notification message via the radio base station 30.

Figure 6:
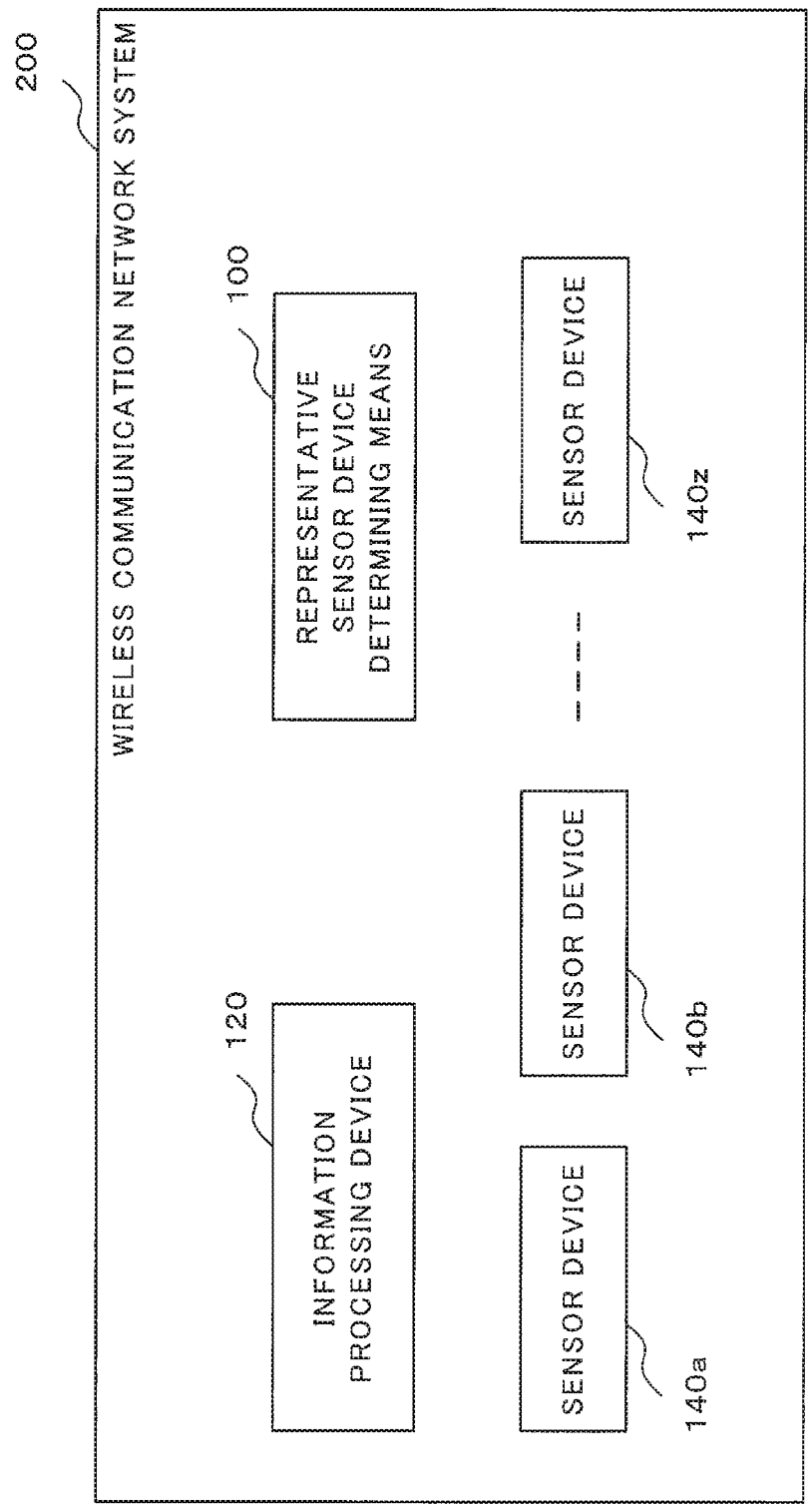
FIG. 6 is a block diagram illustrating the summary of the present invention.

Next, the summary of the present invention is described. FIG. 6 is a block diagram illustrating the summary of the present invention. As illustrated in FIG. 6, a wireless communication network system 200 of the present invention includes: sensor devices 140a to 140z (corresponding to the sensor devices 40a to 40z in FIG. 1) that are mutually connected via a communication network (corresponding to the LAN 45 in FIG. 1); an information processing device (corresponding to the server 20 in FIG. 1) 120; and a representative sensor device determining means (corresponding to the CPU 21 of the server 20 or any one of the CPUs 41a to 41z of the sensor devices 41a to 41z) 100.

The sensor devices 140a to 140z are mutually connected via the communication network. The information processing device 120 transmits and receives information to and from at least a part of the plurality of sensor devices 140a to 140z via a radio base station.

The representative sensor device determining means 100 selects and determines, from among the sensor devices 140a to 140z, a representative sensor device for transmitting measurement result information indicating results of measurement by each of the plurality of sensor devices 140a to 140z to the information processing device 120 via the radio base station.

The information processing device 120 transmits parameter list information including a list of parameters for the representative sensor device determining means 100 to determine the representative sensor device. Upon receiving the parameter list information, the sensor devices 140a to 140z individually transmit device parameter information indicating the parameters of each of the sensor devices of their own corresponding to the parameter list included in the parameter list information.

The representative sensor device determining means 100 determines the representative sensor device based on the transmitted device parameter information. Further, any one of the sensor devices 140a to 140z determined as being the representative sensor device by the representative sensor device determining means 100 transmits, to the information processing device 120, the measurement result information generated by the sensor device itself and the measurement result information generated by the other sensor devices.

According to the configuration, appropriate selection of the sensor device for communicating with the information processing device 120 would be carried out from among the plurality of sensor devices 140a to 140z in the wireless communication network system. Consequently, this can prevent a problem in communication between each of the sensor devices 140a to 140z and the information processing device 120 from occurring. This can also prevent a problem in transmission of the results of measurement by each of the sensor devices 140a to 140z from occurring.

In addition, the above-described exemplary embodiments also disclose the wireless communication network system as described in (1) to (5) as follows.

(1) The wireless communication network system 200, wherein the sensor devices 140a to 140z belong to any one of a plurality of groups and the information processing device 120 transmits the parameter list information by designating a destination group to which the sensor device 140a to 140z belong.

According to the configuration, the representative sensor device of the sensor devices belonging to each group is able to be determined on a group-by-group basis. Consequently, the processing of transmitting results of measurement by each of the sensor devices is flexibly operable.

(2) The wireless communication network system 200, wherein the representative sensor device determining means 100 is included in the information processing device 120.

According to the configuration, influences on the transmission and reception and the processing of the results of measurement by the sensor devices 140a to 140z are able to be prevented satisfactorily by means of the information processing device 120 with typically high processing capability for determining the representative sensor device.

(3) The wireless communication network system 200, wherein the information processing device 120 transmits the parameter list information to a temporary representative sensor device, which is a sensor device determined in advance from among the plurality of sensor devices 140a to 140z, via the radio base station, the temporary representative sensor device notifies the other sensor devices 140a to 140z of a parameter list indicated by the transmitted parameter list information, via the communication network, the sensor device 140a to 140z notified of the parameter list transmits device parameter information of the own sensor device corresponding to the notified parameter list, to the temporary representative sensor device via the communication network, and the temporary representative sensor device transmits the device parameter information transmitted from the other sensor devices and device parameter information of the own sensor device to the information processing device 120.

According to the configuration, the amount of communication between the sensor devices 140a to 140z and the information processing device 120 is able to be reduced, since the temporary representative sensor device, as a representative of the sensor devices 140a to 140z, communicates with the information processing device 120. Hence, the amount of communication resources used between the sensor devices 140a to 140z and the information processing device 120 is able to be reduced.

(4) The wireless communication network system 200, wherein the representative sensor device determining means 100 is included in at least any one of the sensor devices 140a to 140z.

According to the configuration, the amount of communication between the sensor devices 140a to 140z and the information processing device 120 is able to be reduced further, since the representative sensor device can be determined without transmitting device parameter information to the information processing device 120 via a radio base station. Accordingly, the amount of communication resources used between the sensor devices 140a to 140z and the information processing device 120 is able to be reduced further.

(5) The wireless communication network system 200, wherein the representative sensor device determining means 100 transmits a representative determination notification indicating the determination as being the representative sensor device to the sensor device determined as being the representative sensor device, and the sensor device that receives the representative determination notification transmits an ID of the own sensor device to the other sensor devices via the communication network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-019531, filed on Feb. 4, 2014, the disclosure of which is incorporated herein in its entirety by reference.

REFERENCE SIGNS LIST

20 Server
21, 41a-z, 43a-z CPU
30 Radio base station
31 Cell
40a-z, 42a-z, 140a-z Sensor devices
45 LAN
100 Representative sensor device determining means
120 Information processing device
200 Wireless communication network system

The invention claimed is:

1. A wireless communication network system comprising:
a plurality of sensor devices mutually connected via a communication network;
an information processing device configured to transmit and receive information to and from at least a part of the plurality of sensor devices via a radio base station; and
a processor configured to select and determine, from among the plurality of sensor devices, a representative sensor device for transmitting measurement result information indicating a result of a measurement by each of the plurality of sensor devices to the information processing device via the radio base station, wherein the information processing device is configured to transmit parameter list information including a list of parameters for the processor to determine the representative sensor device;
wherein upon receiving the parameter list information, the representative sensor device is configured to transmit device parameter information indicating a parameter of the representative sensor device corresponding to a list of parameters included in the parameter list information;
the processor is further configured to determine the representative sensor device based on the device parameter information; and
the sensor device determined as being the representative sensor device is configured to transmit, to the information processing device, measurement result information generated by the representative sensor device and measurement result information generated by other sensor devices,
wherein the information processing device is configured to transmit the parameter list information to a temporary representative sensor device, which is a sensor device determined in advance from among the plurality of sensor devices, via the radio base station;
the temporary representative sensor device is configured to notify the other sensor devices of a parameter list indicated by the transmitted parameter list information, via the communication network;
each sensor device notified of the parameter list is configured to transmit its own device parameter information, corresponding to the notified parameter list, to the temporary representative sensor device via the communication network; and
the temporary representative sensor device is configured to transmit the device parameter information transmitted from the other sensor devices and its own device parameter information to the information processing device.

2. The wireless communication network system according to claim 1, wherein the processor is included in at least any one of the sensor devices.

3. The wireless communication network system according to claim 1, wherein the processor is configured to transmit a representative determination notification indicating the determination as being the representative sensor device to the sensor device determined as being the representative sensor device; and
the sensor device that receives the representative determination notification is configured to transmit its ID to the other sensor devices via the communication network.

4. The wireless communication network system according to claim 1, wherein
the sensor device belongs to any one of a plurality of groups; and
the information processing device transmits the parameter list information by designating a destination group to which the sensor device belongs.

5. The wireless communication network system according to claim 1, wherein the processor is included in the information processing device.

6. A method for determining a representative sensor device in a wireless communication network system, the method comprising:
transmitting, by an information processing device configured to transmit and receive information via a radio base station to and from at least a part of a plurality of sensor devices mutually connected via a communication network, parameter list information including a list of parameters to select and determine, from among the plurality of sensor devices, a representative sensor device for transmitting measurement result information indicating a result of measurement by each of the plurality of sensor devices to a information processing device via the radio base station;

transmitting, by the sensor device upon receiving the parameter list information, device parameter information indicating a parameter of the sensor device corresponding to a list of parameters included in the parameter list information;

determining, by a processor configured to determine the representative sensor device, the representative sensor device based on the device parameter information; and transmitting, by the representative sensor device, measurement result information generated by the representative sensor device and measurement result information generated by other sensor devices, to the information processing device, wherein the method further includes:

transmitting, by the information processing device, the parameter list information to a temporary representative sensor device, which is a sensor device determined in advance from among the plurality of sensor devices, via the radio base station;

notifying, by the temporary representative sensor device, to the other sensor devices of a parameter list indicated by the transmitted parameter list information, via the communication network;

transmitting, by each sensor device notified of the parameter list, device parameter information corresponding to the notified parameter list to the temporary representative sensor device via the communication network; and transmitting, by the temporary representative sensor device, the device parameter information transmitted from the other sensor devices and its own device parameter information to the information processing device.

7. A wireless communication network system comprising:
a plurality of sensor devices mutually connected via a communication network;
an information processing device configured to transmit and receive information to and from at least a part of the plurality of sensor devices via a radio base station; and a processor configured to select and determine, from among the plurality of sensor devices, a representative sensor device for transmitting measurement result information indicating a result of a measurement by each of the plurality of sensor devices to the information processing device via the radio base station, wherein the information processing device is configured to transmit parameter list information including a list of parameters for the processor to determine the representative sensor device;

upon receiving the parameter list information, the sensor device is configured to transmit device parameter information indicating a parameter of the sensor device corresponding to a list of parameters included in the parameter list information;

the processor is configured to determine the representative sensor device based on the device parameter information; and the sensor device determined as being the representative sensor device is configured to transmit, to the information processing device, measurement result information generated by the representative sensor device and measurement result information generated by other sensor devices, wherein the information processing device is configured to transmit the parameter list information to a temporary representative sensor device, which is a sensor device determined in advance from among the plurality of sensor devices, via the radio base station;

the temporary representative sensor device is configured to notify the other sensor devices of a parameter list indicated by the transmitted parameter list information, via the communication network;

each sensor device notified of the parameter list is configured to transmit its own device parameter information, corresponding to the notified parameter list, to the temporary representative sensor device via the communication network; and the temporary representative sensor device is configured to transmit the device parameter information transmitted from the other sensor devices and its own device parameter information to the information processing device.

* * * * *